May 26, 1936. F. WINKLER 2,041,893

FREEWHEEL HUB WITH COASTER BRAKE AND BRAKE LOCKING DEVICE

Filed June 13, 1935

Inventor
Franz Winkler
By Dean, Fairbank, Hirsch & Foster

Patented May 26, 1936

2,041,893

UNITED STATES PATENT OFFICE 2,041,893

FREEWHEEL HUB WITH COASTER BRAKE AND BRAKE-LOCKING DEVICE

Franz Winkler, Schweinfurt, Germany

Application June 13, 1935, Serial No. 26,347
In Germany June 16, 1934

5 Claims. (Cl. 192—6)

The invention relates to a device for fixing the brake of a free-wheel coaster brake particularly of bicycle hubs in its operative position merely by back-pedalling. In free-wheel coaster hubs in which the driving body is automatically coupled to the driving wheel on pedalling forward, while the application of the brake is effected by back-pedalling, whereby power is transmitted from the driver to the brake, back pressure must be applied to the cranks continuously to maintain the braking effect.

The object of the invention is to obtain immobilization of the driver on back-pedalling thus maintaining the brake applied for the desired time without requiring constant pressure being put on the cranks.

This object is attained by means of a frictionally engaging device composed of substantially coaxial stationary parts and parts rotating with, and attached to, the driver; the device being mounted on the free end of the driver and on the wheel axle, respectively. By so constructing this locking device that the several parts come to frictional engagement on back-pedalling automatic immobilization of the driver and consequently continuous application of the brake will be secured, special means enabling disengagement of the frictional coupling grip.

A further object of the invention is to allow further backward rotation of the driver after establishment of the locking effect, so that the brake can be applied with increased power. This effect is attained by providing frictional interengagement of some of the intermediate transmitting parts of the device which parts permit a relative sliding rotation in spite of the engagement of the locking means.

In the accompanying drawing, which forms a part of this specification, two embodiments of the invention are represented by way of example. In the drawing—

Like or similar reference characters denote like or similar parts throughout all figures of the drawing.

Figure 1:
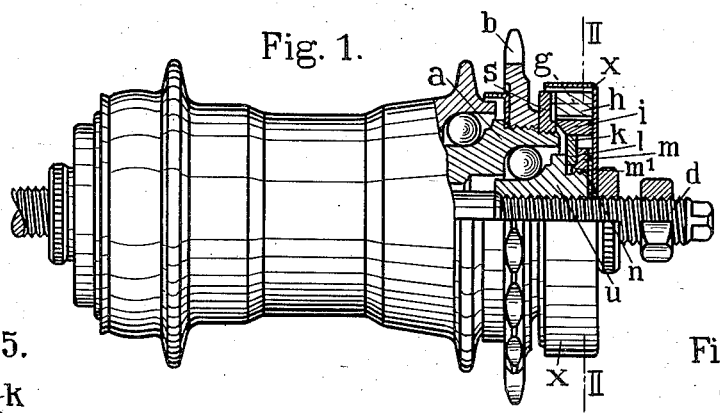
Fig. 1 shows a side view of a bicycle coaster hub provided with the locking device which is represented in axial sectional elevation.
Figure 5:
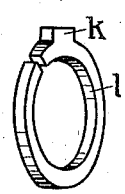
Figs. 5 to 7 illustrate details common to both constructions.
Figure 7:
Figure 6:
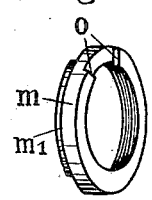
Figure 2:
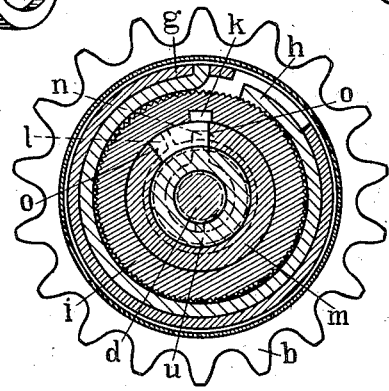
Fig. 2 illustrates a cross-section of the locking device on the line II—II of Fig. 1.

In the embodiment of the invention shown by Figs. 1 and 2, the usual lock nut for the sprocket wheel $b$ on the driver $a$ has been replaced by an intermediate disc $s$ which is, likewise screwed on the left-hand screw thread formed on the free end of the driver and carries an annular lateral projection or flange $g$ in a recess of which is lodged the end bent off outwards of an annular lock spring $h$. The free end of this lock spring is provided with a plurality of small teeth directed towards the inside and adapted to engage with the corresponding teeth of a lock sleeve $i$. The bore of the said lock sleeve has a radial recess into which extends a lug $k$ directed outwards from a friction spring $l$ which in turn is carried by a lateral cylindrical projection $m_1$ of a nut $m$; said nut is adapted to be screwed with a left-hand thread on the bearing cone $u$ stationarily fixed on the wheel axle $d$, and being taken along by friction by the spring $l$ when the latter revolves. Stops $o$ are provided by the ends of a recess made in the right hand face of the nut which stops will permit of a limited rocking rotation of the said nut at the end of which one of the stops will bear against a lock finger $n$ carried by a ring clamped on the wheel axle $d$ between the cone $u$ and a protecting cap $x$. Thus on backward rotation of the nut $m$ the friction ring $l$ is non-rotatably fixed while forward rotation of the said nut will release the ring $l$.

The locking device operates as follows. When, by back-pedalling, the brake (not shown) is actuated, the intermediate disc $s$ will take along the lock spring $h$, and as the teeth at the free end thereof are in engagement with the teeth of the lock sleeve $i$ the latter will be turned in the same direction the same as the friction spring $l$ which is by the lug $k$ prevented from an angular displacement relatively to the said sleeve $i$. By the frictional contact, the friction spring $l$ further takes along the nut $m$ which is thus screwed upon the left-hand thread of the cone $u$ towards a shoulder thereof until the said friction spring has been clamped against any angular displacement between this shoulder and the nut $m$. On account of the positive interconnection above described of the several members also the lock sleeve $i$ has now been immobilized against any angular displacement. This locking effect is arrived at even when braking starts. An increased braking effect being desired, it suffices again to move the pedals slightly backwards so that the lock spring $h$ is with its teeth shifted over the toothed periphery of the lock sleeve $i$. In this way it is possible to lock the driver in several angular positions. When the brake is to be released the cyclist pedals as usually forwards. This being done the lock spring $h$ is put under tension around the periphery of the lock sleeve $i$ so that the interlocking teeth are prevented from being disengaged. The lock sleeve now being turned in forward direction takes along the friction spring $l$ which turns the ring nut $m$ by friction thereby screwing it in right-hand direction until the rear stop $o$ has been brought into engagement with the lock finger $n$, when the ring $l$ will be free from being clamped. Then the driver is rendered freely revoluble again and the brake is brought into its neutral position in the usual manner. The angular displacement of the nut $m$ being limited is an important feature which permits of a small displacement of the pedals when the brake is actuated, so that the spring $l$ is clamped already when braking starts.

Figure 4:
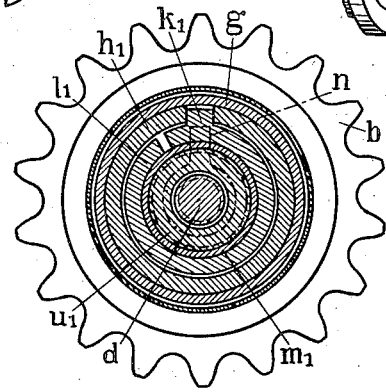
Fig. 4 is a cross-section on the line IV—IV of Fig. 3.
Figure 3:
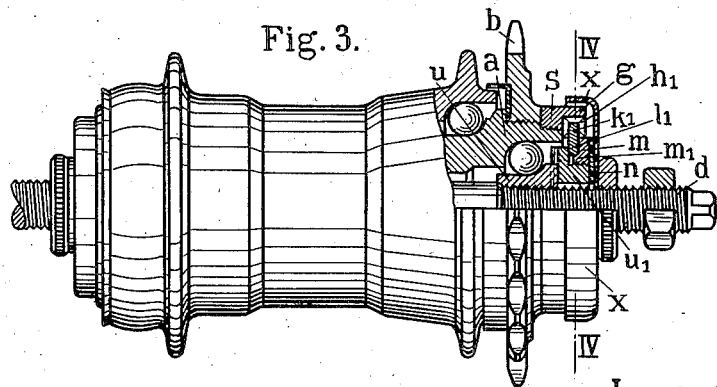
Fig. 3 is an axial sectional view of a modification of the locking device.

Referring to the embodiment shown by Figs. 3 and 4, in the annular projection $g$ of the intermediate disc $s$ there is yieldingly lodged a split spring ring $h_1$ the ends of which leave a gap between them into which extends the projection $k_1$ of a friction spring $l_1$. The other members are identical with those described above. Also the modus operandi is substantially identical; when the brake is to be more tightened after having been applied, the spring $h_1$ prevented from relative angular displacement by the clamped friction spring $l_1$ will slide with its periphery on the internal face of the projecting flange $g$ which is being turned backwards for increasing the braking pressure. Continuous braking is effected by the driver being immobilized through the friction prevailing between the members $g$ and $h_1$. When the pedals are moved in the forward direction this friction will suffice for releasing the friction spring $l_1$ again from its clamping position.

This embodiment also shows that for facilitating mounting the bearing cone may be made of two parts $u$ and $u_1$ coupled by means of teeth provided on their adjacent ends.

I claim:

1. In a device for locking the brake member of a free-wheel coaster hub actuated by driver, the combination with a driver, of concentric members revoluble with the driver, and stationary clamping means adapted to couple said members to non-rotatable parts of the hub.

2. In a device for locking the brake member of a free-wheel coaster hub actuated by driver, the combination with a driver, of concentric members revoluble with the driver, stationary clamping means adapted to couple said members to non-rotatable parts of the hub, and stops limiting the stroke of the clamping means.

3. In a free-wheel coaster hub, the combination with a driver adapted to apply the brake on back-pedalling, of means rotatable with the driver, a spring member in engagement therewith, stationary clamping means having screw threads, a stop flange, a nut screwable thereon towards and away from said stop-flange, and interconnecting means disposed between the said spring members and clamping means and adapted to be immobilized by the clamping means.

4. In a free-wheel coaster hub, the combination with a driver adapted to apply the brake on back-pedalling, of a clamping coupling disposed upon the wheel axle, a friction spring capable of being locked by the clamping coupling, stops for limiting the shifting movement of the clamping coupling, and means disposed between the driver and the friction spring allowing a relative angular movement between them.

5. In a free-wheel coaster hub, the combination with a driver adapted to apply the brake on back-pedalling, of a clamping coupling disposed upon the wheel axle, a friction spring capable of being locked by the clamping coupling, stops for limiting the shifting movement of the clamping coupling, and means disposed between the driver and the friction spring, capable of sliding relative angular movement for backward rotation of the driver during engagement of the clamping coupling.

FRANZ WINKLER.